United States Patent [19]

Leiber

[11] Patent Number: 4,776,643
[45] Date of Patent: Oct. 11, 1988

[54] METHOD FOR FEEDBACK OF MALFUNCTIONS IN BRAKE SYSTEMS, AND BRAKE SYSTEM OPERATING BY THIS METHOD

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 750,551

[22] Filed: Jul. 1, 1985

[30] Foreign Application Priority Data

Jul. 25, 1984 [DE] Fed. Rep. of Germany ....... 3427358

[51] Int. Cl.$^4$ ............................................ B60T 17/22
[52] U.S. Cl. ...................................... 303/92; 303/119; 60/535; 60/545
[58] Field of Search .................. 303/92, 114, 100, 61, 303/119, 115; 60/534, 540, 535, 545, 546

[56] References Cited

U.S. PATENT DOCUMENTS

| | | | |
|---|---|---|---|
| 3,767,272 | 10/1973 | Leiber | 303/92 |
| 4,114,496 | 9/1978 | Leiber | 303/114 |
| 4,141,595 | 2/1979 | Leiber | 303/119 |
| 4,526,003 | 7/1985 | Leiber | 303/114 |
| 4,555,144 | 11/1985 | Belart et al. | 303/92 |

FOREIGN PATENT DOCUMENTS 2613219 10/1977 Fed. Rep. of Germany.
3203563 9/1983 Fed. Rep. of Germany ...... 303/119

Primary Examiner—John W. Caldwell, Sr.
Assistant Examiner—Alvin Oberley
Attorney, Agent, or Firm—Edwin E. Greigg

[57] ABSTRACT

A brake system which has a brake booster, a brake pedal which acts via a travel simulator device upon the brake booster, at least one anti-skid valve, two sensors ($S_p$, $S_I$) and a pulse emitter. One of the sensors measures braking pressures. The other sensor ($S_I$) measures the displacement distances of a piston, which is displaced in the brake booster to effect braking. A comparator connected to the sensors ($S_p$, $S_I$) switches the pulse emitter on whenever the piston travels a longer displacement distance than is permissible at a predetermined braking pressure. The pulse emitter controls the anti-skid valve such that a driver who actuates the brake system perceives changes in braking acceleration, and these changes are intended to emphatically cause him to seek a repair facility.

8 Claims, 2 Drawing Sheets

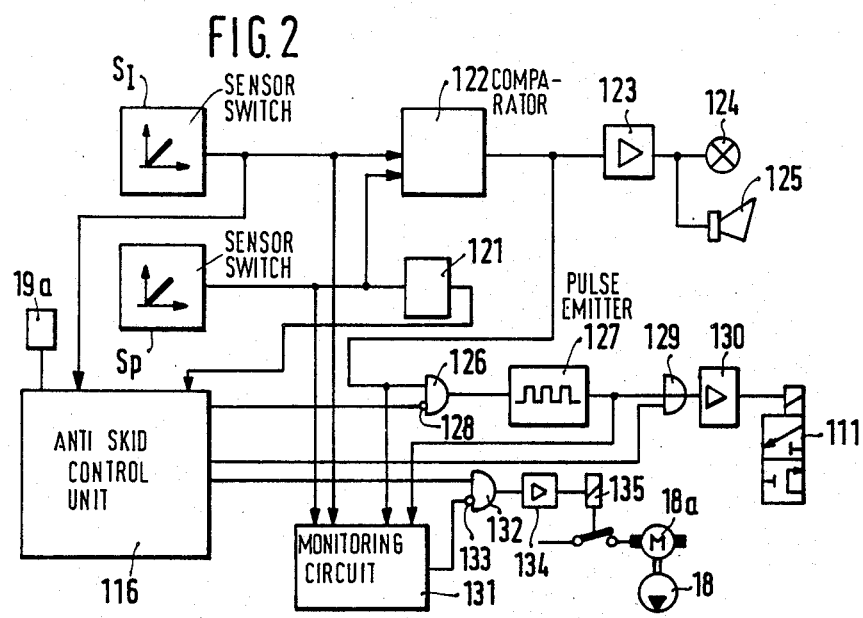
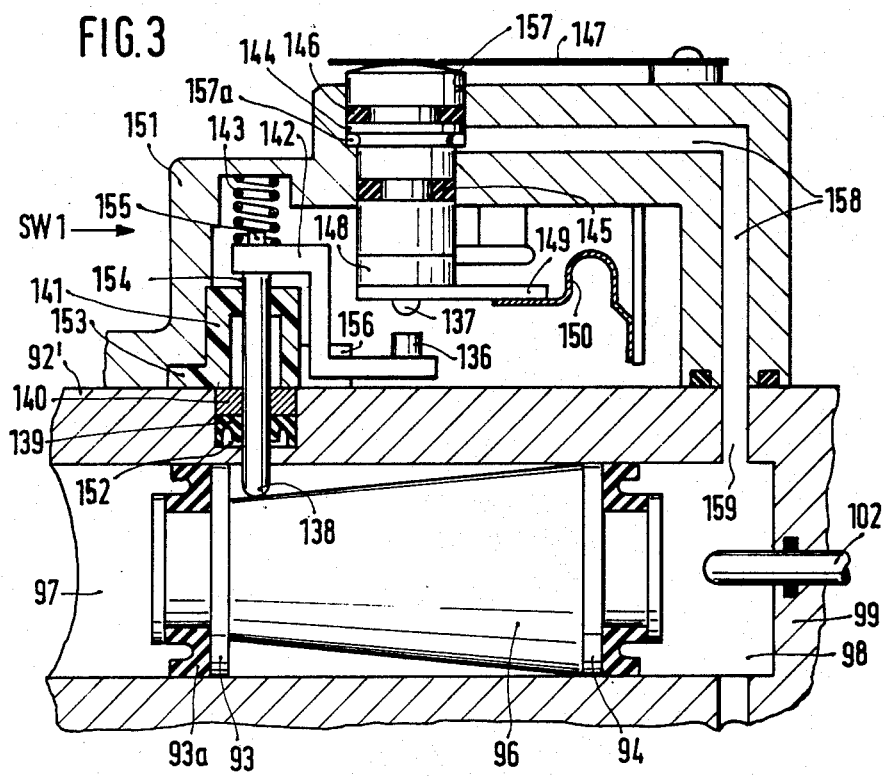

METHOD FOR FEEDBACK OF MALFUNCTIONS IN BRAKE SYSTEMS, AND BRAKE SYSTEM OPERATING BY THIS METHOD

BACKGROUND OF THE INVENTION

The invention is based on a method and to a brake system having a brake booster.

Brake boosters are well known (German application Nos. DE-OS 25 31 264 and DE-OS 31 51 292). In these known brake boosters, one brake circuit is typically closed, and one is open. The open brake circuit is supplied directly with a reservoir pressure fed via a control valve or brake valve. If the pressure supply should fail, the open brake circuit becomes a closed brake circuit. Typically the open brake circuit includes an annular piston, which is mounted on a pedal tappet actuated by the brake pedal.

Two basic types of brake boosters can be identified: those equipped with a travel simulator spring, and those without such a spring, which exerts a perceptible feedback of force to the brake pedal. However, one problem in a brake booster equipped with a travel simulator spring, which is basically superior in its characteristics to a brake booster lacking a travel simulator, is the lack of feedback to the brake pedal of any arbitrary malfunction in the brake circuit. In other words, the driver has no sensation of any malfunction such as the failure of a brake circuit, poor ventilation, vapor bubbles, possible seizing of a control piston acted upon by brake pressure, or the like.

Although in such brake boosters having a travel simulator it is possible to detect malfunctions by the evaluation of piston movements in the brake booster as compared with the movement of the pedal tappet and then to warn the operation of any malfunction via visual and/or acoustical signals, the driver does not necessarily pay attention to such acoustical signals, and he is inclined simply to drive on, without taking care of the problem, unless the malfunction makes itself characteristically and strongly felt during the brake actuation itself.

OBJECT AND SUMMARY OF THE INVENTION

The method and the brake system according to the invention have the advantage that even in a brake booster with a travel simulator, optimal feedback, which is perceptible to the driver, of malfunctions or failures is effected. The feedback is effected via at least one perceptible change in braking deceleration.

In a further feature of the method according to the invention, there is the advantage that in case of malfunction or failure, the driver is also perceptibly warned by way of the brake pedal. No additional changes need to be made in existing brake systems in which the operation of anti-skid brake valves is already perceptible at the brake pedal. On the other hand, for instance by matching a spring constant of the travel simulator spring and a mass of a control slide of the brake booster, it is assured that pressure changes will occur in the brake booster which then have a feedback effect on the brake pedal via the travel simulator spring.

A further feature of the brake system according to the invention has the advantage of rhythmic changes in the braking deceleration, which warn the driver at once, even if there is no feedback at the brake pedal itself.

Practical realizations of the invention are also disclosed. Embodying the system as further provided by the invention has the advantage that a failure of the warning device is also perceptibly communicated to the driver. In still another feature of the invention, the warning is indicated particularly intensively.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 is a block circuit diagram of the exemplary embodiment shown in FIG. 1; and FIG. 3 is a detail of a second exemplary embodiment of the invention.

DESCRIPTION OF THE PREFERRED EMBODIMENTS

Figure 1:
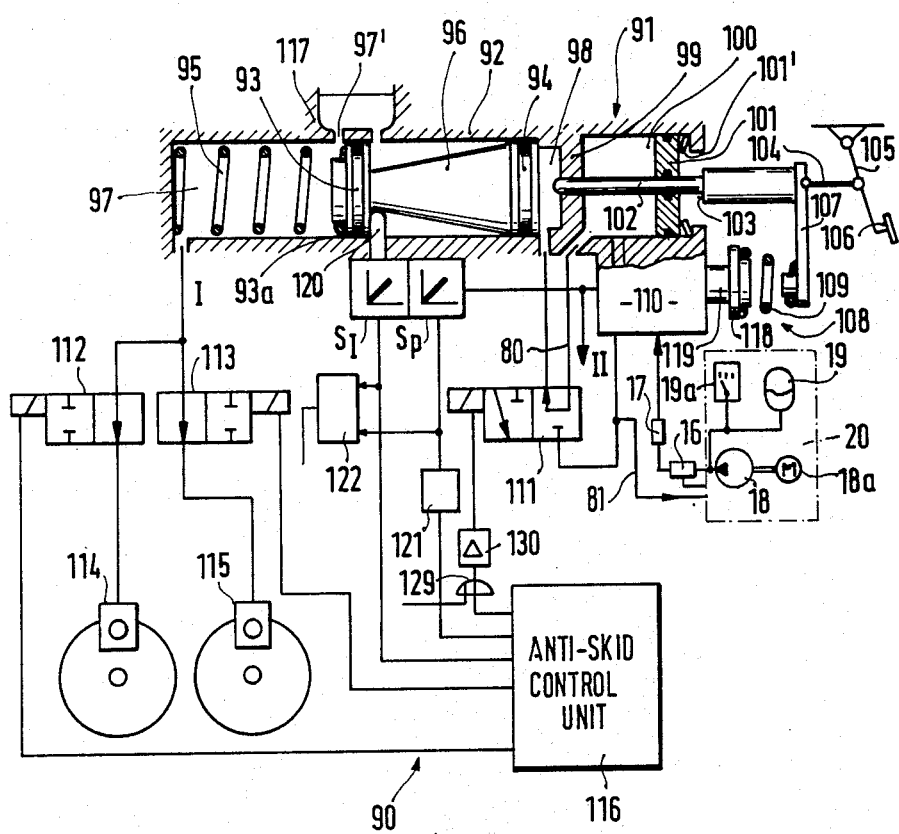
FIG. 1 shows a first exemplary embodiment of the invention.

The exemplary embodiment of a brake system 90 shown in FIGS. 1 and 2 includes a brake booster 91. The brake booster 91 includes a linear housing including a dual circuit main cylinder 92 including therein pistons 93 and 94, which are separated by a conical connecting rod 96. A restoring spring 95 in main cylinder work chamber 97 forces the pistons 93 and 94 toward an impingement chamber 98 formed by an end of piston 94 and a partition 99. The partition 99 and an annular piston 101 forms pressure chamber 100 within which the annular piston is movable by a pedal tappet extension 103 secured at one end to a plate 107. The pedal tappet extension 103 is provided with a pedal tappet portion 102 which extends through the annular piston 101 chamber 100 and into the impingement chamber 98 for mechanical operation of piston 94. A pedal linkage 104 connects between the plate 107 and to pedal lever 105 for operation of the pedal tappet extension when the brake pedal 106 is moved. The plate 107 extends downwardly from the pedal tappet extension for operation of the travel simulator device 108. The travel simulator device 108 includes travel simulator spring 109, and a control valve 110. The system also includes an anti-skid valve 111, two pressure maintenance valves 112, 113, two wheel brakes 114 and 115, an anti-skid control unit 116 which together with other components embodies an anti-skid brake system (ABS), and two sensors $S_I$ and $S_P$.

The two pistons 93 and 94 are coaxially oriented and are firmly interconnected by means of the conical connecting rod 96. Accordingly, the main cylinder work chamber 97 and the impingement chamber 98, which are both adapted to the diameters of the pistons 93, 94, are likewise coaxially oriented. The restoring spring 95 is disposed between a closed end of the main cylinder work chamber 97 and the piston 93. The restoring spring 95 urges both pistons 93, 94 in the direction of the partition 99, which with the piston 94 defines the impingement chamber 98. The alignment of the piston 94 near the partition 99 as shown comes about solely by the action of the restoring spring 95. As a result, the main cylinder work chamber 97 communicates via a fluid equalizing opening 97' with an equalizing container 117. The pressure chamber 100 is cylindrically embodied and coaxially adjoins the impingement chamber 98 at the partition 99. The pressure chamber 100 is closed on the end remote from the partition 99 by the annular piston 101. The pedal tappet 102 extends coaxially with the main cylinder work chamber 97 and extends through the annular piston 101, the pressure chamber 100 and the partition 99 as far as the interior of the impingement chamber 98. Outside the pressure chamber 100, the pedal tappet extension 103 is joined to the pedal tappet 102. The pedal tappet extension 103 is dimensioned such that during braking, when the brake system 90 is operating properly, this extension 103 is at a minimum distance from the annular piston 101, which in its normal position is located beside a stop ring 101'. The pedal linkage 104 and the pedal lever 105 couple the pedal tappet 102 to the brake pedal 106, so that a driver is capable of displacing the pedal tappet 102 by means of the brake pedal. The plate 107 extends transversely to the pedal tappet 102 and is rigidly coupled thereto. The travel simulator device 108 adjoins the plate 107 in the direction of the control valve 110, which is disposed beside the pressure chamber 100. This is travel simulator device 108 has the travel simulator spring 109 already mentioned, which at one end rests on the plate 107 and at the other end on a spring plate 118. The spring plate 118 is carried by a control slide 119. The control slide 119 is embodied in accordance with known practices, and it is displaceable inside the control valve 110 in a parallel orientation with respect to the pedal tappet 102. Via the plate 107 and the travel simulator spring 109, the above-mentioned actuation of the brake pedal 106 therefore effects a displacement of the control slide 119 as well. The displacement of the control slide 119 is smaller than that of the pedal tappet 102, during normal braking because of the spacing between plate 107 and control slide 119. This normal situation is present if a reservoir pressure supply device 20, to which the control valve 110 is connected, is supplying pressure. In a known manner, the reservoir pressure supply device 20 includes a pump 18, which is drivable by means of a motor 18a; a reservoir 19; a pressure switch 19a; and a prior art pressure limiting valve 16. The communication of the reservoir pressure supply device 20 with the control valve 110 is effected in a known manner via a prior art check valve 17.

Connected to the control valve 110 are the pressure chamber 100, a brake circuit II, the anti-skid control valve 111 and the sensor $S_P$. Brake circuit II is, by way of example, a rear axle brake circuit of a known type, so no illustration of its anti-skid valve is believed necessary. The anti-skid valve 111 is embodied as a 3/2 way valve and assumes the basic position shown whenever braking is either not taking place or is being performed only so lightly that no notable brake slippage arises. In the basic position shown, the anti-skid valve 111 connects the pressure chamber 100 with the impingement chamber 98 so that the same pressure prevails in the chamber 98 as in the pressure control valve 110. During this situation the anti-skid valve 111 blocks off the return flow line 81 which leads to the pressure supply device 20.

If braking is performed so severely that impermissible amount of brake slippage occurs, then the anti-skid control unit 116 sends a signal to the control of the valve 111 which moves the anti-skid valve 111 into its working position (the symbol in which the area points downward and to the right). In this position, the anti-skid valve 111 connects the impingement chamber 98 to the return flow line indicated by dashed lines, so that the impingement pressure prevailing in the impingement chamber 98 drops below the pressure prevailing in the pressure chamber 100. Accordingly, the pistons 94, 93 move toward the right in the drawings, and the brake pressure likewise drops, with the result that the impermissible brake slippage becomes less and finally disappears. The sensor $S_P$ is embodied as an analog transducer in a known manner, so that for pressures which can be fed into the brake circuit II by means of the control valve 110 it effects analog indications, which produces electrical signals which are supplied to the anti-skid electronic control unit 116. The sensor $S_I$ is for example likewise embodied as an analog transducer which produces an output of electrical signals. Upon a displacement of the piston 94, as a result of the conical shape of the connecting rod 96, this sensor $S_I$ is adjusted via an actuating pin 120. This sensor indication is likewise supplied to the anti-skid electronic control unit 116. When the brakes are being applied in a normal manner the electrical output of switches $S_I$ and $S_P$ are the same value.

A brake circuit I is connected to the main cylinder work chamber 97. This circuit is a front axle brake circuit, for instance, which is divided into the two pressure control maintenance valves 112 and 113 which are electronically controlled by the electronic control 116, to which the front wheel brakes 114 and 115, respectively, are connected. In the basic position, shown, the pressure control maintenance valves are open which permits the brake fluid to pass to the brakes. Both the pressure maintenance valves 112 and 113 and the anti-skid valve 111, as well as further valves of the brake circuit II which are not shown, are connected to the anti-skid control unit 116, so as to be controlled by it in the event of an anti-skid situation. The anti-skid control unit 116 is designed for instance in a manner known in the prior art and it is not necessary to be described in detail here.

The connection of the sensor $S_P$ to the anti-skid control unit 116 is effected via a differentiator 121. The differentiator serves in a known manner, during braking in which there is a danger of skidding, to electrically control the at least one anti-skid valve 111 in such a way that in this situation a different, lesser pressure gradient is directed to the chamber 98 during brake pressure buildup than during normal braking.

To perform the method of operation according to the invention, the sensors $S_I$ and $S_P$ are connected to a comparator 122 which compares the output of switch $S_I$, with the output of switch $S_P$. The comparator 122 is arranged such that it emits a malfunction or failure signal, in response for instance to looseness such as wear of a sealing sleeve 93a, for instance, which seals off the piston 93 form the main cylinder work chamber, that is, if this piston 93 undergoes a displacement which is greater than the expected displacement at the same braking pressure and when the sleeve 93a is properly tight. Excessive piston displacement can also arise if there is a leak in the brake circuit I, or if one piston of a wheel brake is displaced beyond a permissible extent because of a loose brake disk, for instance. A malfunction or failure signal of this kind is carried via a switch amplifier 123 (see FIG. 2) to a warning lamp 124 or some other visual and/or acoustical warning device 125. The signal is also directed to an AND gate 126, to which a pulse emitter 127, which is embodied for instance as an astable multivibrator, is connected. This pulse emitter 127 is embodied by way of example such that the pulses it is supposed to emit, which control the anti-skid valve 111, bring about clearly perceptible changes in the braking pressure and hence in deceleration as well via this valve 111. Additionally, the AND gate 126 is connected to the anti-skid control unit 116 via an inverting input 128. If there is no danger of skidding, then the anti-skid control unit 116 enables the AND gate 126 to switch through. The result of switching the AND gate 126 through is that the pulse emitter 127 supplies the output signal to an OR gate 129. The OR gate 129, in turn, controls a switch amplifier 130, which moves the anti-skid valve 111 into its position for pressure reduction. Parallel to this, when there is a danger of skidding, this anti-skid valve 111 can also be directed into the pressure reduction position by the anti-skid unit 116 via the OR gate 129.

Additionally, the brake system 90 includes a monitoring circuit 131, which is connected for instance to the sensors $S_I$ and $S_P$, the comparator 122 and the pulse emitter 127. The monitoring circuit 131 is embodied such that it monitors the signals delivered to it for their plausibility in accordance with a predetermined plan, thereby recognizing any errors that may arise in the above-named components. Connected to the output side of the monitoring circuit 131 are an AND gate 132, which has an inverting input 133; a switch amplifier 134; and a switching device 135, which for instance is embodied as a relay and serves to control the motor 18a of the pump 18. This motor 18a is normally switched on and off by the pressure switch 19a via the AND gate 132. The AND gate 132, with its inverting input 133, thus serves to be able to switch the running motor 18a off in the manner described below.

Function of the First Exemplary Embodiment

When the brake system 90 is working properly, the reservoir pressure supply device 20 furnishes a minimum pressure to the control valve 110 via valves 16 and 17. If the brake pedal 106 is actuated, then the plate 107, via the travel simulator spring 109, displaces the control slide 119 relative to a control sleeve, not shown and for example being of a known type. As a result, a pressure rise takes place in the brake circuit II and in the impingement chamber 98. The pressure rise in brake circuit II effects braking forces. As a result of the simultaneous pressure rise in the impingement chamber 98 due to movement of piston 101 pressure from chamber 100 via control valve 111 displaces the piston 94 which displaces the piston 93 counter to the action of the restoring spring 95, so that a pressure is also generated in brake circuit I, which generates braking forces in the front wheel brakes 114, 115. If the brake pedal 106 is actuated so hard that for instance one of the wheel brakes 114 or 115 grips excessively hard, then the anti-skid control unit 116 switches the anti-skid valve 111 into the pressure reduction (second) position. If at this time there should be no danger of skidding at one of the wheel brakes 114 or 115, then the associated one of the pressure maintenance valves 112 or 113 is moved by the anti-skid control unit 116 into the blocking position. The result is that the pressure drops only in the particular wheel brake which is causing the danger of skidding. If the anti-skid control unit 116 ascertains that the danger of skidding has been overcome, then it returns the anti-skid valve 111 into the basic position shown, so that the pressure rises once again, indirectly, via the action exerted upon the piston 94. Once this rise has taken place, then the anti-skid control unit 116 returns the pressure maintenance valve 112 or 113, which may have been moved into its blocking position, back to its open position. As already noted, during the braking pressure increase, the differentiator 121 is used for moving the anti-skid valve 111 back and forth between its pressure buildup position and its pressure reduction position in such a way that a desirably slow rise in braking pressure takes place in the brake circuit I. This is advantageous for instance when braking on an icy road surface.

If there is a leak at the sealing sleeve 93a or in the brake circuit I, then the piston 94 displaces the piston 93 counter to the restoring spring 95 by an amount that exceeds the normal amount associated with the particular pressure prevailing. As a result, the signals then emitted by the sensors or switches $S_I$ and $S_P$ are no longer in a proper relationship with one another. The comparator 122 recognizes this situation and switches on the warning light 124 and/or the acoustical warning device 125 and furthermore effects the already discussed pulse-wise triggering of the anti-skid valve 111. The for instance rhythmical or periodic triggering of the anti-skid valve 111 is performed such that the driver notices at least a change in braking deceleration. The pulse-wise actuation of the anti-skid valve 111 causes pressure fluctuations in the control valve 110, because of the inertia of the control slide 119 and the elasticity of the travel simulator spring 109. These fluctuations can be felt at the brake pedal 106, for instance via the control slide 119, the travel simulator spring 109, the plate 107, the pedal linkage 104 and the pedal lever 105. Additionally, however, braking pressure fluctuations that take place inside the impingement chamber 98 are made perceptible at the brake pedal 106 via the pedal tappet 102, which acts like a sensing piston. Depending on the pulse frequency selected, the driver who is actuating the brake pedal will be warned by vibrations or pulsating movements of the brake pedal 106, regardless of whether he notices the warning light 124 or whether the acoustical warning device 125 has failed. The result of the periodic reduction in the braking pressure is that in order to attain a predetermined braking acceleration, the brake pedal 106 must be actuated more forcefully than usual. This is a persistent warning to the driver.

If one of the sensors $S_I$ or $S_P$ or the comparator 122 or the pulse emitter 127 should fail, by way of example, then the monitoring circuit 131, via the AND gate 132, the switch amplifier 134 and the switching device 135, shuts off the motor 18a of the pump 18. As a result, during a first braking, and more often one of subsequent brakings, which are performed after the monitoring circuit 131 has responded, the pressure supply in the reservoir 19 is dropped to such an extent that a brake boosting which would be desirable per se no longer takes place, at least not entirely. The driver is then compelled to depress the brake pedal 106 so far that the pedal tappet 102 displaces the pistons 93 and 94. If this should not suffice for a required braking deceleration, then finally the annular piston 101 will also be displaced, via the pedal tappet extension 103, so that a sufficient pressure does come about in brake circuit II as well.

It should further be noted that it is also possible to link the comparator 122 with the inverting input 133 of the AND gate 132. The result would be that impermissibly large displacements of the piston 93 recognized by means of the sensors $S_I$ and $S_P$ would cause the shutoff of the motor 18a. In this manner, by-passing the monitoring circuit 131, it is again possible to make the driver aware of malfunctions and failures in the brake system. This last-described control principle is naturally also applicable alone, instead of the pulse-wise actuation of the anti-skid valve 111 in the event of malfunction or failure. The monitoring circuit 131 can also be adopted for instance in a brake system as shown in FIG. 3, even if such a system for instance does not include any anti-skid valves. Furthermore, the basic concept of generating pressure fluctuations which are perceptible at the brake pedal 106 by means of a valve, for instance an anti-skid valve, is not restricted to the brake booster configuration and valve combination shown herein. The principle according to the invention is instead applicable to brake boosters having for instance two open brake circuits and an anti-skid valve combination adapted to that configuration.

Structure and Function of the Second Exemplary Embodiment

The exemplary embodiment shown in FIG. 3 differs from that of FIGS. 1 and 2 in that instead of sensors $S_I$ and $S_P$, a malfunction switch SW1 is disposed on the structurally adapted dual circuit main cylinder 92'. The dual circuit main cylinder 92' again has two pistons 93 and 94, a conical connecting rod 96, a main cylinder work chamber 97, an impingement chamber 98 and a partition 99. The pedal tappet 102 already described extends in a longitudinally movable manner through the partition 99 and into the impingement chamber 98, as shown in FIG. 1.

The malfunction switch SW1 has two contacts 136, 137, a pin 138 which extends to the conical section 96, a sealing sleeve 139, a guide ring 140, a guide sleeve 141, a switch arm 142, a compression spring 143, a differential piston 144 having two sealing rings 145 and 146, a leaf spring 147, an insulating element 148, a connection lug 149, a flexible connecting line 150 and a housing 151. A stepped bore 152 is disposed in the dual circuit main cylinder 92', transverse to the connecting rod 96. The narrower portion of the stepped bore 152 is closer to the connecting rod 96 than the wider portion of the stepped bore 152. The pin 139 extends through the stepped bore 152 toward the connecting rod 96. The sealing sleeve 139, which sealingly surrounds the pin 138, is inserted into the wider portion of the stepped bore 152. Adjacent to the sealing sleeve 139, the guide ring 140 is inserted into the stepped bore 152. The guide sleeve 141 is mounted upon the dual circuit main cylinder 92', extending coaxially with respect to the pin 138. The guide sleeve 141 has a securing flange 153, which is pressed by means of the housing 151 against the dual circuit main cylinder 92'. Opposite the connecting rod 96, the pin 138 has a tang 155 on its end 154 protruding out from the guide sleeve 141. The switch arm 142 is Z-shaped and is slipped onto the tang 155. The tang 155 protrudes beyond the switch arm 142 and centers the compression spring 143, which is supported in the housing 151. Two guide elements are molded onto the guide sleeve 141.

One guide element 156, which is shown, has a limiting face extending parallel to the pin 138. The switch arm 142 is guided between the two guide elements, which are spaced apart from one another. The switch arm 142 carries the contact 136, pointing away from the dual circuit main cylinder 92'. The differential piston 144 is aligned such that its longitudinal axis extends parallel to the pin 138 and meets the contact 136. On its side facing the contact 136, the differential piston 144 carries the insulating element 148, on which the connection lug 149 and the further contact 137 are secured.

The differential piston 144 is displaceable in a stepped bore 157. The narrower portion of the stepped bore 157 is located closer to the dual circuit main cylinder 92' than the wider portion. At a transition 157a between the narrower and the wider portions, the stepped bore 157 communicates with the impingement chamber 98 via an angled conduit 158, which extends within the housing 151, and a further conduit 159, which adjoins the conduit 158 and discharges into the impingement chamber 98. The sealing rings 145 and 146 assure sealing between the differential piston 144 and the stepped bore 157. The leaf spring 147 is secured outside on the housing 151 and presses the differential piston 144 in the direction of the contact 136.

A displacement of the piston 94 also effects a synchronous displacement of the conical connecting rod 96. In accordance with ½ the angle of its conicity, the pin 138 is thereby displaced counter to the compression spring 143. The displacement of the pin 138 is transmitted to the contact 136 by means of the switch arm 142. A pressure prevailing in the impingement chamber 98 is carried through the conduits 159 and 158 into the stepped bore 157 as well. This pressure urges the differential piston 144 in such a way that a force that is directed counter to the leaf spring 143 is generated. As a result, depending upon the initial tension and elasticity of the leaf spring 147, the contact 137 will move by a predetermined amount at a predetermined pressure. The leaf spring 147 is adapted in such a way, taking into account an effective impingement surface area of the differential piston 144, that if the dual circuit main cylinder 92' is not malfunctioning and with a brake circuit connected to it, a distance will always remain between the contacts 136 and 137 despite a varying force being exerted upon the piston 94. On the other hand, if there is some malfunction or failure, then the space between the contacts 136 and 137 disappears, and via the compression spring 143, the flexible connecting line 150 is connected in an electrically conductive manner with the housing 151. As a result, the malfunction switch SW1 is as suitable replacement for the sensors $S_I$ and $S_P$, which are for instance of the analog type, and the comparator 122. A signal generated by the malfunction switch SW1 in the event of a malfunction or failure is again used, via a pulse emitter 127, for reversing an anti-skid valve 111 and/or for shutting off a motor 18a of a pump 18.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake system including a logic circuit, a brake booster including first and second pistons therein, an inpingement chamber defined on one side by said first piston, a sensing piston rigidly secured to a brake pedal which acts upon said first piston, a pressure-sensitive sensor ($S_P$) disposed on said brake booster and a sensor ($S_I$) which detects displacements of said first and second pistons, each of said sensors are embodied as electrically functioning sensors with at least one of the sensors embodied as a sensor functioning in analog fashion, and each of said sensors ($S_P$, $S_I$) produce an electrical signal that is connected to a comparator and said comparator produces an output signal which is a component of the logic circuit to switch a pulse emitter on to indicate malfunctions and failures, and an anti-skid system (ABS), including at least one anti-skid control valve connected to said impingement chamber, a control circuit for controlling said anti-skid control valve said control circuit including said pulse emitter, which in the event of a malfunction or a failure during braking, controls said at least one anti-skid valve such that fluid flows from said impingement chamber and at least one brake deceleration change is perceptible to the driver via said sensing piston.

2. A brake system as defined by claim 1, characterized in that the pulse emitter is embodied as an electronic astable multivibrator.

3. A brake system as defined by claim 1, characterized in that said sensors ($S_P$, $S_I$) indicate a malfunction and failure and said pulse emitter is connected to a monitoring circuit, which performs plausibility monitoring operations and in the event of malfunction or failure shuts off a brake fluid pump which supplies said brake booster.

4. A brake system as defined by claim 2, characterized in that said sensors that indicates a malfunction and failure and said pulse emitter are connected to a monitoring circuit, which performs plausibility monitoring operations and in the event of malfunction or failure shuts off a brake fluid pump which supplies said brake booster.

5. A brake system as defined by claim 1, characterized in that said sensors ($S_P$, $S_I$) that report malfunctions or failures are indirectly connected to at least one warning device.

6. A brake system as defined by claim 2, characterized in that said sensors that report malfunctions or failures are connected to at least one warning device.

7. A brake system as defined by claim 3, characterized in that said sensors that report malfunctions or failures are connected to at least one warning device.

8. A brake system having a brake pedal, a brake booster, which comprises a pressure source (20), a control valve (110) connected thereto and to an impingement work chamber via an anti-skid valve, a travel simulator (109) between the control valve and a brake pedal (106), a first piston (94) operative in said impingement work chamber (98), a second piston (93) operative in a main cylingder chamber (97) and displaceable by said first piston (94), an anti-skid apparatus (ABS) including said anti-skid valve (111), a pressure-sensitive sensor ($S_P$) disposed on said brake booster and a sensor ($S_I$) which detects displacements of said pair of pistons each of said sensors are embodied as electrically functioning sensors with one sensor being embodied as an analog transducer for indicating malfunctions and failures in the brake system including brakes (114, 115) communicating with said main cylinder chamber (97), a sensing piston (102) rigidly coupled with said brake pedal by which one end of said sensing piston can be insterted into the impingement chamber (98) to act upon said first piston, a logic circuit, each of said sensors ($S_I$) and $S_P$) produce an electrical signal that is connected to a comparator, said comparator is a part of said logic circuit and produces a signal which is directed to an astable multivibrator in such a way that in the event of failure of said brake system said astable multivibrator triggers the anti-skid valve (111) at least once, in order to reduce an impingement pressure in the impingement chamber (98) at least once and to make said at least one pressure reduction perceptible at the brake pedal (106) via said sensing piston (102).

* * * * *